United States Patent Office 3,491,017
Patented Jan. 20, 1970

3,491,017
HYDROCRACKING START-UP PROCEDURE
Lester M. Rapp, Hightstown, N.J., assignor to Cities Service Research and Development Company, New York, N.Y., a corporation of Delaware
No Drawing. Filed Dec. 26, 1967, Ser. No. 693,108
Int. Cl. C10g 13/02
U.S. Cl. 208—108                                  4 Claims

ABSTRACT OF THE DISCLOSURE

A start-up procedure for a hydrocarbon oil hydrocracking process in which a high boiling feed oil containing asphaltenes and metals is hydrocracked in the presence of fresh catalyst. Operating conditions are such that low levels of conversion are maintained until catalyst aging has reached the three barrel per pound level and operating conditions are then changed to increase conversion to substantially higher levels. This procedure minimizes deactivation of fresh catalyst by asphaltenes and metals in the feedstock.

---

This invention relates to the hydrogenation of heavy hydrocarbon oil at least a portion of which boils above 975° F. Such hydrogenation reactions may be directed primarly to the cracking of heavy oil to form lower boiling material or may be directed primarily to desulfurization of the oil or a combination of these reactions. Other reactions commonly found in association with these reactions may, of course, also take place. The techniques for conducting hydrogenation of such feedstocks in a wide variety of operating conditions are well-known and established in the art. Among the known techniques for hydrogenation of heavy hydrocarbon oils are those in which the hydrocarbon oil feed, together with hydrogen-containing gas, is passed in an intimate vapor-liquid mixture upwardly through a reaction zone containing a mass of particulate hydrogenation catalyst at a rate sufficient to maintain the solids in random motion and under conditions such that there is a net chemical consumption of hydrogen and that the hydrocarbons in the effluent from the reaction zone are at least partially in the liquid phase. A suitable catalyst system for use in processes of this type is the so-called ebullated bed system described in moret detail in U.S. Patent to Johanson Re. 25,770.

In the hydrocracking of heavy hydrocarbon oils, notably those containing relatively large amounts of metals and asphaltene materials, in the presence of new catalyst to convert large amounts of the high boiling feed material to lower boiling product material, considerable difficulty has been encountered due to plugging and deactivation of catalyst by asphaltenes and metals contained in the feed. This problem is especially acute where the desired conversion level exceeds about 75% (as used in this application, the term conversion refers to the volume percent of hydrocarbon oil boiling above 975° F. which is converted to material boiling below 975° F.).

It has now been found that when heavy hydrocarbon feed oil at least 20 volume percent (vol. percent) of which boils above 975° F. and which contains at least 5 vol. percent asphaltenes (material insoluble in pentane) is to be hydrocracked in the presence of new hydrogenation catalyst to convert at least 50 volume percent of the feed material boiling above 975° F. to material boiling below 975° F., excessive deactivation of the new catalyst can be avoided by limiting conversion to less than about 40% until at least about 3 barrels of feed oil boiling above 975° F. per pound of catalyst, preferably at least about 5 b./lb., have been processed and then increasing conversion to the desired level above 50%, preferably above 75%.

High conversion reactions for the hydrocracking of heavy hydrocarbon oils are carried out at conversion levels exceeding about 50%, frequently exceeding about 75%, and are normally conducted at liquid hourly space velocities (LHSV) between about 0.3 and about 5 based upon feed oil boiling above 975° F. Temperatures between about 800 and 900° F., hydrogen partial pressures between about 1,000 and about 3,000 p.s.i.g. and hydrogen rates between about 1,000 and about 10,000 standard cubic feet of hydrogen per barrel (s.c.f./b.) of feed boiling above 975° F. are normal for such operations.

In starting up such a process for the hydrocracking of heavy hydrocarbon oil it is conventional, even with new catalyst, to reach the desired high conversion levels as soon as possible. In such startup procedures it is generally necessary to heat the reactants to the temperature at which the hydrocracking of heavy oils takes place and then, taking advantage of both external heat and exothermic heat of reaction, gradually raise the temperature to the desired operating temperature needed for hydrocracking of the heavy oil to the desired conversion level.

Preheating of the system to normal operating temperature before cutting in desired feed material is frequently impractical because of excessive requirements for preheat furnaces. It is, therefore, conventional practice to initially feed a low boiling oil, such as cycle oil from catalytic cracking, into the system together with hydrogen at desired operating pressure and with the reactor heated only to a temperature of from 50 to as much as 200° F. below desired operating temperature. For instance, using a low boiling oil, the reactor may be heated to about 500 to 800° F., at which point the low boiling feed may be discontinued and the desired heavy feed material containing oil boiling above 975° F cut in at normal rates. Because of the low temperature the conversion is frequently well below desired operating conversion levels. The temperature of the reactor is then gradually raised utilizing both exothermic heat of reaction and external preheat. As rapidly as the situation allows the temperature is usually brought up, with conversion gradually rising until the desired conversion level of greater than 50% and frequently greater than 75% is obtained at normal operating temperature. This is accomplished in a period of time appoximating one day and usually before more than one barrel of fresh feed material boiling above 975° F. per pound of catalyst present in the reaction zone is processed.

Conventional startup of hydrocracking processes using new catalyst and heavy hydrocarbon feed oil containing substantial quantities of asphaltenes has frequently resulted in extremely rapid deactivation of the new catalyst (the term new catalyst is used herein to mean fresh catalyst which has not been regenerated and has not previously been used for hydrocarbon conversion processes or which, if used, has been used to process less than about one barrel of hydrocarbon oil boiling above 975° F., per pound of catalyst). Such rapid and extensive deactivation has frequently resulted in an inability to reach the desired conversion levels due to contamination and agglomeration of catalyst and even where desired conversion levels have been reached, has resulted in very reduced catalyst life. According to a preferred embodiment of the present invention, premature deactivation of this type may be avoided by operating the hydrocracking reaction at conversion levels not exceeding about 40% until the catalyst has been aged to at least about three barrels per pound (b./lb.), preferably at least about five b./lb. (i.e. until five barrels of feed boiling above about 975° F. have been processed per pound of catalyst in the reaction zone). Once catalyst has reached the desired age, then the conversion is increased to the desired conversion levels of at least 50%, preferably at least 75%, and the operation thereafter is carried out in accordance with normal procedures.

In starting up hydrocracking processes in accordance with the present invention, the conversion levels may be controlled in any suitable manner. For instance space velocity of high boiling material and temperature in the reaction zone can be kept low or higher temperatures and higher space velocities may be used so long as the conversion is maintained below about 40% until the desired catalyst age is reached. Other methods of controlling conversion are of course readily apparent to those skilled in the art.

Hydrocarbon oils having significant portions, usually at least 20 volume percent, boiling above 975° F. and which contain substantial amounts of asphaltenes, usually at least 5 vol. percent and frequently greater than 15 vol. percent are suitable feed oils for practicing the present invention. Such oils are frequently residual oils and contain, in addition to the asphaltenes, heavy metals such as nickel and vanadium. Especially suitable feedstocks for use in the present invention are high boiling oils which contain at least 15 vol. percent asphaltenes or which contain at least 5 vol. percent asphaltenes and in which the alphaltenes contain large amounts, such as more than 1,000 parts per million (p.p.m.) of heavy metals such as nickel and vanadium. Suitable feedstocks of this type include residual oils, shale oil, bitumen (including that which occurs naturally, such as found in the Athabasca Tar Sands), coal tar, uncracked gas oil and other so called "bottom of the barrel" materials.

Catalyst suitable for use in practicing the present invention may be any suitable hydrogenation catalyst, either natural or synthetic, the composition, particle size and quantity of such catalyst forming no part of the present invention. Suitable catalysts include for example cobalt, iron, molybdenum, nickel, tungsten and cobalt molybdate, as well as their sulphides and oxides, used alone or together with other suitable catalysts, such as naturally occurring silicates, on suitable bases such as alumina or silica alumina. The catalyst may be employed in any suitable form such as fixed bed, slurry or the ebullated bed described in U.S. patent to Johanson Re. 25,770.

While the reasons for the increased operability and improved catalyst life experienced when starting up hydrocracking processes in accordance with the present invention are not fully understood, it is believed that at high conversion levels the asphaltenes in the feed material are preferentially acted upon by new catalyst to a much greater extent than by catalyst which has been slightly aged. This may be due to a combination of the desulfurization activity of the catalyst, the high sulfur content of the asphaltenes and the pore size of most catalysts. Hydrogenation catalysts of the type described above generally have pore volumes between about 0.6 cc./gm. and about 0.8 cc./gm. The average pore diameter is about 150 A. and varies from 50 to 300 A. with a high percentage of large pores. Catalyst having pore sizes within this range is considered preferable for use of the present invention. Asphaltene molecules are considerably larger than molecules of the other portions of the feed material (asphaltenes having particle sizes of about 50 to about 300 Angstrom units) and are able to get into the pores of new catalyst in the above pore size range quite easily. By contrast, slightly aged catalyst has pores which have become partially blocked through deactivation and the asphaltene molecules are, on the average, less likely to get to active catalyst sites (which results in desulfurization and demetalization of the asphaltene molecule) as compared with the molecules of the remainder of the feed material. Since the asphaltenes are relatively high in sulfur content as compared with the remainder of the feed material and the catalyst is usually a strong desulfurization catalyst, the net effect of these conditions is believed to be that new catalyst with relatively larger pore openings has a very strong preference for attacking the asphaltenes rather than the remainder of the feed material. Since the asphaltenes are primarily responsible for the deactivation of catalyst, the affect is excessive and premature deactivation of new catalyst. This is aggravated by the high metals content of most asphaltenes and feedstocks containing large amounts of asphaltenes. Consequently those feed oils in which the asphaltenes contain high levels of metals as described above are especially prone to the problems described in this paragraph. By maintaining initial conversion at low levels through the first three to five barrels per pound of catalyst life as described above, the catalyst is allowed to age slightly at low conversion levels. In this process catalyst pores are at least partially blocked so that when the conversion level is raised, the preferential attack on asphaltenes and consequent excessive deactivation of catalyst does not take place. Operability and catalyst life are thereby considerably proved.

As mentioned above, the critical feature of the present invention is maintaining conversion of the high boiling feed less than about 40% until the catalyst has aged to the desired level. The time required for this phase of the startup operation will, of course, vary considerably depending upon the exact feed, operating conditions and catalyst used. In typical hydrocracking operations where start up in a conventional manner would raise conversion substantially above the 40% level in a day or less, operation in accordance with this invention at or below the 40% level until a catalyst age of at least three and preferably five barrels per pound is reached, will frequently take at least 10 days.

The following example will illustrate the application of the present invention to a typical hydrocracking situation in which a heavy hydrocarbon feed oil having the properties shown in Table I, below is hydrocracked in an ebullated bed reaction zone in the presence of cobalt-molybdate on alumina hydrogenation catalyst in the form of $\frac{1}{32}$ inch extrudate.

EXAMPLE

In Run No. 1 the operation was started up with new catalyst in the conventional manner described above and conversion was increased as rapidly as possible until the operating conditions shown in Table II below were reached. At this point, with a catalyst age of only 1.8 b./lb., the ebullated bed separated and collapsed. On inspection, the catalyst was found to have formed agglomerates and was stuck together. The desired conversion level of 80% was not reached.

In run 2 the unit is started up and, in accordance with the present invention, operated at conditions shown in Table II until a catalyst age of 4 b./lb. is reached in about 14 days. Conversion is then increased to 80% and 65 days after start up operating conditions are as shown in Table II with a catalyst age of 10 b./lb.

TABLE I. FEEDSTOCK SPECIFICATIONS

Total feed:
    Gravity _____ API__ 10.1°
    Sulphur _____ wt. percent__ 4.11
    Ramsbottom carbon residue ___ wt. percent__ 12.60
    Nitrogen _____ p.p.m__ 3510
    Carbon _____ wt. percent__ 85.08
    Hydrogen _____ wt. percent__ 10.87
    IBP to 975° F. _____ vol. percent__ 43
    975° F.+ _____ vol. percent__ 57

975° F.+fraction:
- Gravity _____ API__ 4.6°
- Sulfur _____ wt. percent__ 5.07
- Ramsbottom carbon residue ___ wt. percent__ 21.7
- Asphaltenes _____ wt. percent__ 15.1
- Metals in Asphaltenes
  - Nickel _____ p.p.m__ 410
  - Vanadium _____ p.p.m__ 620
- Saturates _____ wt. percent__ 23.8
- Polar resins _____ wt. percent__ 19.7
- Aromatics _____ wt. percent__ 41.4

TABLE II.—OPERATING CONDITIONS

|  | Run 1 | Run 2 Start Up | Run 2 Normal |
|---|---|---|---|
| Hydrogen Partial Pressure (p.s.i.g.) | 2,200 | 2,200 | 2,200 |
| Temperature (° F.) | 815 | 800 | 815 |
| Space velocity (v./hr./v.) | 0.6 | 1.4 | 0.6 |
| Hydrogen rate s.c.f./b | 5,000 | 5,000 | 5,000 |
| Catalyst age (no addition) (b./lb.) | 0.1–1.8 | 0–4.0 | 4.0–10.0 |
| Conversion (vol. percent) | 73 | 35 | 80 |

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:
1. In the starting up of a process for hydrocracking heavy hydrocarbon feed oil at least 20 volume percent of which boils above 975° F. and which contains at least 5 volume percent asphaltenes, in the presence of hydrogen-containing gas and new hydrogenation catalyst, to convert at least 50 volume percent of the feed material boiling above 975° F. to material boiling below 975° F. the improvement which comprises:
   (a) initially feeding such heavy hydrocarbon oil to a hydrocracking reaction zone containing new hydrogenation catalyst while maintaining the reaction zone under operating conditions such that less than about 40 volume percent of such heavy hydrocarbon oil boiling above 975° F. is converted to material boiling below 975° F.;
   (b) continuing operation of the hydrocracking reaction zone under operating conditions such that no more than about 40 volume percent of such heavy hydrocarbon oil boiling above 975° F. is converted to material boiling below 975° F. until at least about three barrels of such heavy hydrocarbon oil boiling above 975° F. per pound of new catalyst in the reaction zone have been processed in the reaction zone; and then
   (c) varying operating conditions in the reaction zone to increase conversion of such heavy hydrocarbon oil boiling above 975° F. to material boiling below 975° F. to normal desired operating conditions including conversions of at least about 50 volume percent, temperatures between about 800 and about 900° F., space velocities between about 0.3 and about 5.0 v./hr./v. and hydrogen partial pressure between about 1000 and about 3000 p.s.i.g.

2. The process of claim 1 in which the heavy hydrocarbon feed oil contains at least 15 volume percent asphaltenes and the normal desired operating conversion of material boiling above 975° F. to material boiling below 975° F. which is obtained in step (c) is at least about 75 volume percent.

3. The process of claim 1 in which the asphaltene content of the heavy hydrocarbon feed oil includes at least about 1,000 parts per million of one or more metals selected from the group consisting of nickel and vanadium and in which the normal operating conversion level obtained in step (c) for conversion of such feed oil boiling above 975° F. to material boiling below 975° F. is at least 75 volume percent.

4. The process of claim 1 in which the conversion of heavy hydrocarbon feed oil boiling above 975° F. to material boiling below 975° F. is maintained below about 40 vol. percent, for a period of at least ten days and until at least about five barrels of heavy hydrocarbon feed oil boiling above 975° F. have been processed per pound of catalyst in the reaction zone and in which conversion of heavy hydrocarbon feed oil boiling above 975° F. to material boiling below about 975° F. is then increased to at least about 75 volume percent.

References Cited

UNITED STATES PATENTS 3,244,617   4/1966   Galbreath _____ 208—216

DELBERT E. GANTZ, Primary Examiner
A. RIMENS, Assistant Examiner

U.S. Cl. X.R.
208—216